United States Patent
Teper et al.

(10) Patent No.: US 8,251,188 B2
(45) Date of Patent: Aug. 28, 2012

(54) DISC BRAKE HAVING A PIN RAIL CALIPER

(75) Inventors: Boris Teper, Farmington Hills, MI (US); Takeshi Kashimura, West Bloomfield, MI (US); Philip Jedele, Ypsilanti, MI (US)

(73) Assignee: Akebono Brake Corporation, Farmington Hills, MI (US)

( * ) Notice: Subject to any disclaimer, the term of this patent is extended or adjusted under 35 U.S.C. 154(b) by 870 days.

(21) Appl. No.: 12/212,228

(22) Filed: Sep. 17, 2008

(65) Prior Publication Data

US 2010/0065385 A1    Mar. 18, 2010

(51) Int. Cl.
    *F16D 64/14* (2006.01)
(52) U.S. Cl. ............. 188/73.45; 188/73.44; 188/73.39
(58) Field of Classification Search ........... 188/73.45, 188/73.44, 73.39, 73.38
    See application file for complete search history.

(56) References Cited

U.S. PATENT DOCUMENTS

| | | | |
|---|---|---|---|
| 2,994,410 A | 8/1961 | Burnett | |
| 3,051,272 A | 8/1962 | Burnett | |
| 3,119,468 A | 1/1964 | Mossey | |
| 3,183,999 A | 5/1965 | Etal | |
| 3,261,430 A | 7/1966 | Wilson | |
| 3,298,468 A | 1/1967 | Buyze | |
| 3,349,871 A | 10/1967 | Walther | |
| 3,375,906 A * | 4/1968 | Hayes | 188/73.45 |
| 3,486,589 A | 12/1969 | Hillegass | |
| 3,500,966 A * | 3/1970 | Birge | 188/72.4 |
| 3,602,328 A | 8/1971 | Fannin | |
| 3,616,877 A * | 11/1971 | Collins | 188/73.45 |
| 3,628,639 A * | 12/1971 | Daley, Jr. | 188/73.45 |
| 3,915,263 A | 10/1975 | Courbot | |
| 4,093,043 A | 6/1978 | Smith | |
| 4,144,952 A | 3/1979 | Nakayama | |
| 4,193,481 A * | 3/1980 | Wunderlich | 188/71.8 |
| 4,197,926 A | 4/1980 | Youngdale | |

(Continued)

FOREIGN PATENT DOCUMENTS

DE    3934019 C1    5/1991

(Continued)

OTHER PUBLICATIONS

European Search Report, dated Jun. 1, 2011, Application No. 11002401.5.

(Continued)

*Primary Examiner* — Robert A Siconolfi
*Assistant Examiner* — Mariano Sy
(74) *Attorney, Agent, or Firm* — Dobrusin & Thennisch PC

(57) ABSTRACT

A disc brake operable to apply a clamping force to a rotatable disc, the disc brake comprising: a support bracket including a pair of spaced apart frame members at opposite ends of the support bracket, each frame member having a surface with at least three arms extending therefrom, the at least three arms include a first arm, a second arm, and a third arm, each arm having an opening and being disposed in series with a spacing, therebetween, two opposing spaced apart slide pins engaged with the openings of the first, second and third arms such that at least one of the first, second, and third arms are configured to support the slide pins, inner and outer brake shoes, and a caliper body slidably supported by the slide pins, the caliper body having a slidable piston operable to cause the inner and outer brake shoes to move towards one another.

20 Claims, 8 Drawing Sheets

U.S. PATENT DOCUMENTS

| | | |
|---|---|---|
| 4,279,331 A | 7/1981 | Lupertz |
| 4,305,483 A * | 12/1981 | Ikeda .................. 188/73.39 |
| 4,319,668 A | 3/1982 | Johnson et al. |
| 4,344,511 A * | 8/1982 | Stoka et al. ............ 188/73.45 |
| 4,351,421 A | 9/1982 | Kurata et al. |
| 4,355,707 A | 10/1982 | Saito |
| 4,382,493 A | 5/1983 | La Warre |
| 4,418,797 A | 12/1983 | Fujimori |
| 4,460,071 A | 7/1984 | Seki |
| 4,560,037 A * | 12/1985 | Gumkowski et al. ...... 188/73.38 |
| 4,736,822 A | 4/1988 | Thiel |
| 4,905,796 A * | 3/1990 | Schonenberger et al. .. 188/73.39 |
| 4,944,371 A | 7/1990 | Giorgetti |
| 4,958,703 A * | 9/1990 | Op Den Camp .......... 188/73.31 |
| 4,977,987 A | 12/1990 | Schmidt |
| 5,094,323 A | 3/1992 | Mitchell |
| 5,111,914 A | 5/1992 | Thiel |
| 5,111,915 A | 5/1992 | Rupprecht |
| 5,238,090 A | 8/1993 | Weiler |
| 5,263,555 A * | 11/1993 | Imponente et al. ........ 188/73.34 |
| 5,284,228 A | 2/1994 | Weiler |
| 5,330,035 A | 7/1994 | Klimt |
| 5,507,369 A | 4/1996 | Ferreira et al. |
| 5,860,496 A * | 1/1999 | Kullman et al. .......... 188/73.45 |
| 6,039,155 A | 3/2000 | Demoise |
| 6,039,156 A | 3/2000 | Schneider |
| 6,062,349 A | 5/2000 | Boisseau |
| 6,135,245 A * | 10/2000 | Kurasako et al. ......... 188/73.45 |
| 6,179,095 B1 | 1/2001 | Weiler |
| 6,260,670 B1 | 7/2001 | Maehara |
| 6,427,810 B2 | 8/2002 | Schorn |
| 6,609,594 B1 * | 8/2003 | Charmat et al. .......... 188/73.45 |
| 6,920,965 B2 | 7/2005 | Burgdorf |
| 7,201,258 B2 | 4/2007 | Schog |
| 7,377,368 B2 | 5/2008 | Schog |
| 7,431,132 B2 | 10/2008 | Schog |
| 2007/0056812 A1 | 3/2007 | Haupt |
| 2008/0029356 A1 | 2/2008 | Halasy-Wimmer et al. |
| 2009/0236187 A1 | 9/2009 | Bach |

FOREIGN PATENT DOCUMENTS

| | | | |
|---|---|---|---|
| EP | 0096498 A1 | 12/1983 | |
| EP | 0311239 A1 | 4/1989 | |
| EP | 0597893 A1 | 5/1994 | |
| EP | 1604126 A1 | 12/2005 | |
| EP | 1604127 A1 | 12/2005 | |
| EP | 1700047 A1 | 9/2006 | |
| FR | 2345622 A1 | 10/1977 | |
| GB | 1220016 A | 1/1971 | |
| GB | 2033510 A | 5/1980 | |
| GB | 2033989 A * | 5/1980 | ................ 188/73.45 |
| JP | 61082027 A | 4/1986 | |
| JP | 11/063034 A | 3/1999 | |
| JP | 2002/070898 A | 3/2002 | |
| JP | 2006/520449 A | 9/2006 | |
| JP | 2007/528468 A | 10/2007 | |
| JP | 2007534906 A | 11/2007 | |

OTHER PUBLICATIONS

European Office Action, Application No. 10002615.2, pp. 1-5, dated Oct. 13, 2010.

Japanese Office Action, Patent Application No. 2010/054474, filed Apr. 4, 2012.

* cited by examiner

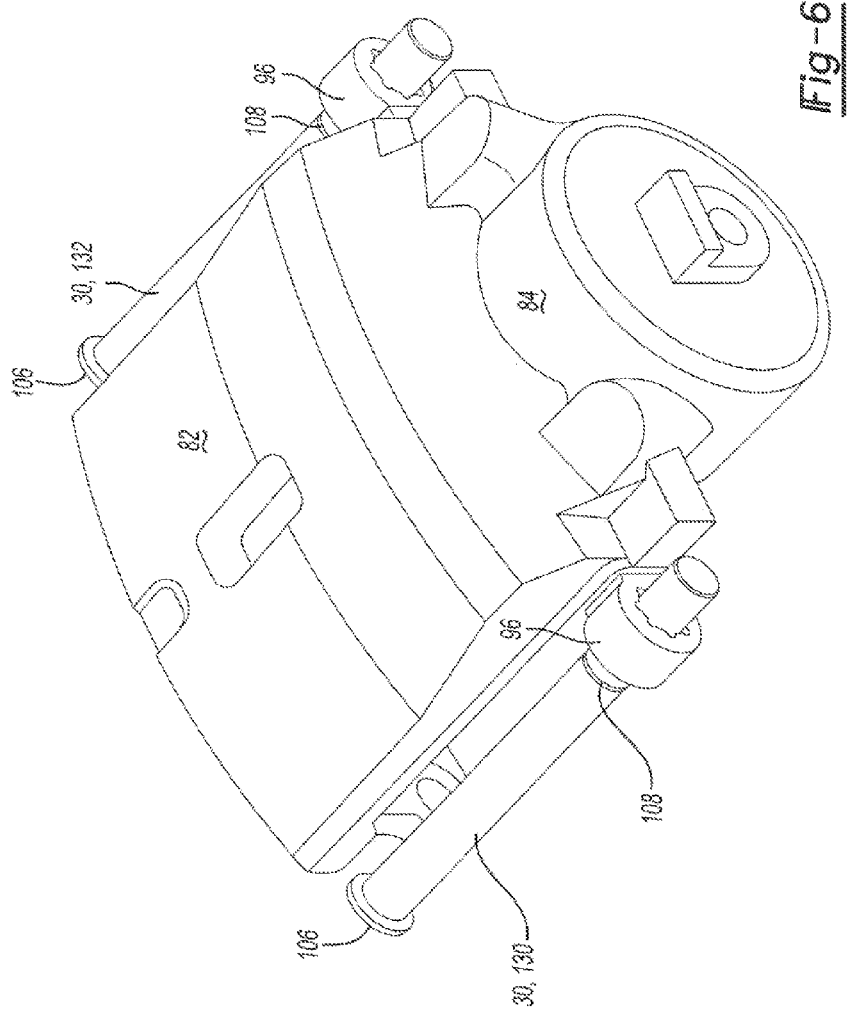

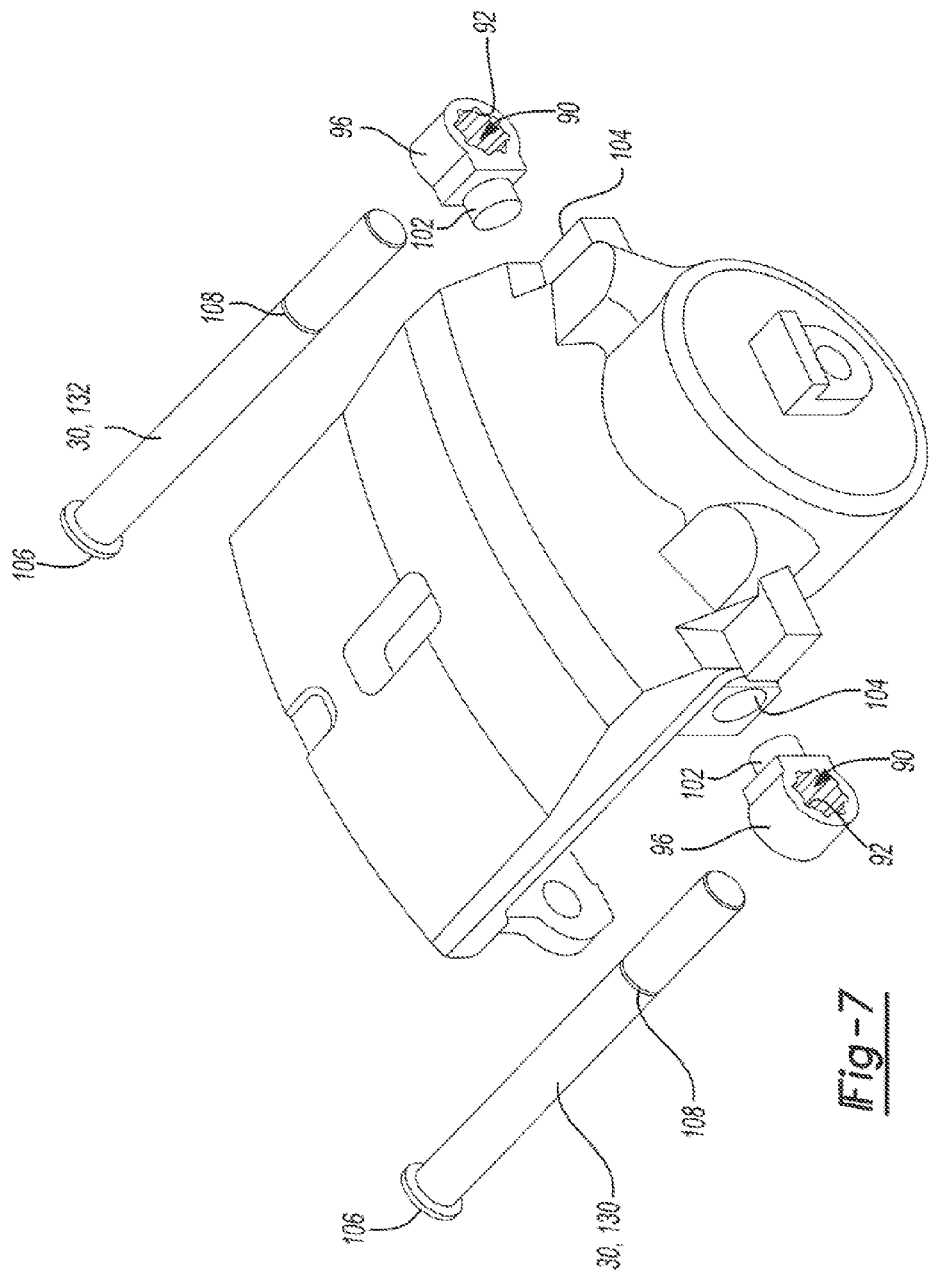

DISC BRAKE HAVING A PIN RAIL CALIPER

FIELD OF THE INVENTION

The present invention relates to an improved brake system, more particularly to an improved brake system that includes a slide mechanism for slidably engaging disc brake components along slide pins.

BACKGROUND OF THE INVENTION

Current disc brake systems commonly include a caliper that temporarily clamps opposing friction pads to an annular braking surface on a rotor thereby applying a braking force. The resulting brake load (e.g., brake torque) may be abutted by the interaction (e.g., supporting) of one or more of the disc brake components in slidable engagement along slide pins. In one particular application, the slide pins may incur heavy loads. In this application, the loads may impart pin deflection, pin stress, or otherwise resulting in possible slide pin failure. The prior art has attempted to solve these problems by providing thicker slide pins to handle the increased loads or abutting the brake shoes against the disc brake support bracket to partially relieve the slide pins from the loads, both requiring additional costs for thicker slide members and/or manufacturing costs associated with machining (e.g., broaching or milling) the brake shoe abutments in the support bracket. In addition the thicker slide members increase the necessary room between the brake rotor and wheel resulting in smaller brake rotors.

In another particular application, a disc brake with slide mechanisms may become "locked-up" such the disc brake components may be unable to substantially freely slide along the slide pins. In this application, the slide mechanism "lock-up" may be caused by contamination (e.g., particles such as dust or debris) interacting with the disc brake components in slidable engagement along the slide pins. The prior art has attempted to solve this problem by sealing, booting, and/or greasing the slide mechanism to protect the disc brake components from the surrounding environment, however these attempts have been adequate at best while adding higher part costs and manufacturing costs associated with forming, installing, and maintaining these additional components.

In another particular application, a disc brake, when temporarily clamping the opposing friction pads, may associate much if not all of the brake load (e.g., brake torque) upon one slide pin while the other slide pin serves merely to maintain the relative positions of each brake shoe. The prior art has attempted to solve this problem through various disc brake configurations, but with limited success and increased manufacturing costs.

It would be particularly attractive to provide an improved pin rail caliper having slide pins that provide brake load abutments while incorporating both "pull" and "push" type abutment modes to generally improve NVH, taper wear, and/or drag performance at a reduced disc brake weight. Examples of disc brake assemblies can be found in U.S. Pat. Nos. 4,144,952, 4,279,331, 4,319,668, 4,344,511, 4,351,421, 4,418,797, 5,094,323, 5,111,915, and 5,860,496, U.S. Application No. 20080029356, which are herein incorporated by reference for all purposes. The present invention improves on these disc brake assemblies as shown and described herein.

SUMMARY OF THE INVENTION

The present invention seeks to improve upon prior disc brake systems and particularly the attachment of disc brake components thereof. In one aspect, the present invention provides a disc brake operable to apply a clamping force to a rotatable disc having a support bracket, two opposing spaced apart slide pins, inner and outer brake shoes and a caliper body. The support bracket includes a pair of spaced apart frame members at opposite ends of the support bracket. Each frame member has a surface with at least three arms extending therefrom. The at least three arms include a first arm, a second arm, and a third arm. Each arm having an opening and being disposed in series with a spacing, therebetween. The two opposing spaced apart slide pins are engaged with the openings of the first, second and third arms such that at least one of the first, second, and third arms are configured to support the slide pins. The caliper body is slidably supported by the slide pins. The caliper body has a slidable piston operable to cause the inner and outer brake shoes to move towards one another. Each of the slide pins are supported by the first, second and third arms of the support bracket so that pin deflection, pin stress, or a combination of both are reduced relative to conventional calipers having pins that carry braking loads.

In another aspect, the present invention provides a disc brake operable to apply a clamping force to a rotatable disc having a support bracket, two opposing spaced apart slide pins, inner and outer brake shoes and a caliper body. The support bracket includes a pair of spaced apart frame members at opposite ends of the support bracket. Each frame member has a surface with at least one arm extending therefrom. The at least one arm includes an opening. The two opposing spaced apart slide pins are engaged with the opening of the at least one arm of each frame member such that at least one of the at least one arm is configured to support the slide pins. The caliper body has a slidable piston operable to cause the inner and outer brake shoes to move towards one another and at least one pair of spaced apart boss portions slidably supported by the slide pins. Each of the boss portions includes a polymeric bushing with a plurality of grooves defining an opening to receive the respective slide pin for slideable engagement (e.g., support the slide pins) thereof.

In another aspect, the present invention provides a disc brake operable to apply a clamping force to a rotatable disc having a support bracket, two opposing spaced apart slide pins, inner and outer brake shoes and a caliper body. The support bracket includes a pair of spaced apart frame members at opposite ends of the support bracket. Each frame member has a surface with at least two arms extending therefrom. The at least two arms include a first arm and a second arm, each arm having an opening and being disposed in series with a spacing, therebetween. The spacing is defined by the side walls of the first and side arms and the surface of the frame member therebetween; The two opposing spaced apart slide pins engaged with the openings of the first, and second arms such that at least one of the first and second arms are configured to support the slide pins. The inner and outer brake shoes have projections extending from opposite ends of the inner and outer brake shoes. The projections of the inner and outer brakes shoe include a respective opening for receiving the slide pins to assist in supporting the inner and outer brake shoes. The projections of the inner and outer brake shoes are located within the spacing between the first and second arms such that the projections of are substantially free of contact with the surface of the frame members. The caliper body has a slidable piston operable to cause the inner and outer brake shoes to move towards one another and a first pair of spaced apart boss portions extending from opposite ends of an inner portion of the caliper body. The boss portions include a respective polymeric bushing with a plurality of grooves that define an opening within each polymeric bushing to receive the respective slide pin for slideable engagement thereof. Wherein, the plurality of grooves assist in removing debris from the respective slide pin while the polymeric bushing slides along the respective slide pin, the plurality of grooves have a groove depth of about 5% to about 20% of an inner diameter of the polymeric bushing, the plurality of grooves form longitudinally extending arcuate grooves that range from about 5 to about 15 grooves; or any combination thereof. The outer brake shoe includes protrusions along an exterior surface of the outer brake shoe and the caliper body includes an outer portion that extends generally parallel to the exterior surface of the outer brake shoe such that the outer portion of the caliper body includes openings for engaging the protrusions of the outer brake shoe so that the outer portion of the caliper body is secured to and supported by the outer brake shoe.

In yet another aspect, any of the aspects of the present invention may be further characterized by one or any combination of the following features: the slide pins are supported by the first, second and third arms of the frame members so that pin deflection, pin stress, or a combination of both are reduced such that the diameter of the slide pins may be reduced from about 20% to about 40% relative to a conventional calipers having pins that carry braking loads; at least one of the inner and outer brake shoes include projections extending from opposite ends of the at least one of the inner and outer brake shoes, the projections include an opening for receiving the slide pin to assist in supporting the respective inner and outer brake shoes; the slide pins are in abutment such that in a brake-on position, the slide pins substantially or completely carry the tangential brake loads; the spacings include a first spacing located between the first and second arms being defined by the side walls of the first and second arms and the surface of the frame member therebetween and a second spacing located between the second and third arms being defined by the side walls of the second and third arms and the surface of the frame member and wherein the inner and outer brakes shoes include projections extending from opposite ends of the inner and outer brake shoes, the projections include an opening for receiving the slide pin to assist in supporting the respective inner and outer brake shoes such that each projection of the outer brake shoe is located within the first spacing between the first and second arms and each projection of the inner brake shoe is located within the second spacing between the second and third arms; the projections of the inner and outer brake shoes are substantially free of contact with the surface of the frame members; at least one of the inner and outer brakes shoes includes a first engagement portion along an exterior surface of the respective brake shoe for securement to a second engagement portion of the caliper body and for support thereof; the first engagement portion includes at least one protrusion along the exterior surface the outer brake shoe and the second engagement portion is at least one opening along an outer portion of the caliper body so that the at least one protrusion engages the at least one opening such that the outer portion of the caliper body is supported by the outer brake shoe; the caliper body includes at least one pair of spaced apart boss portions slidably supported by the slide pins, wherein each of the boss portions includes a polymeric bushing with a plurality of grooves defining an opening to receive the respective slide pin for slideable engagement thereof; the plurality of grooves assist in removing debris from the respective slide pin while the polymeric bushing slides along the respective slide pin, the plurality of grooves have a groove depth of about 5% to about 20% of an inner diameter of the polymeric bushing, the plurality of grooves form longitudinally extending arcuate grooves, the plurality of grooves range from about 5 to about 15 grooves; or any combination thereof; the boss portions are individually deformable to assist in generally aligning the two slide pins such that the support bracket, either or both the inner and outer brake shoes, the caliper body, or any combination thereof substantially freely slides along the slide pins in a generally parallel manner relative to an engaging surface of the rotatable disc. Each boss portion is formed separately from the polymeric bushing and then combined or formed together with the polymeric bushing as an integral polymeric boss component; the at least one pair of spaced apart boss portions includes a first pair of spaced apart boss portions extending from opposite ends of an inner portion of the caliper body; the boss portions are individually deformable to assist in generally aligning the two slide pins such that the support bracket, either or both the inner and outer brake shoes, the caliper body, or any combination thereof substantially freely slides along the slide pins in a generally parallel manner relative to an engaging surface of the rotatable disc; each boss portion is formed separately from the polymeric bushing and then combined or formed together with the polymeric bushing as an integral polymeric boss component; the inner and outer brakes shoes include projections extending from opposite ends of the inner and outer brake shoes, the projections include an opening for receiving the slide pin to assist in supporting the respective inner and outer brake shoes; at least one of the inner and outer brakes shoes includes a first engagement portion along an exterior surface of the respective brake shoe for securement to a second engagement portion of the caliper body and for support thereof and wherein the first engagement portion includes at least one protrusion along the exterior surface the outer brake shoe and the second engagement portion is at least one opening along an outer portion of the caliper body so that the at least one protrusion engages the at least one opening such that the outer portion of the caliper body is supported by the outer brake shoe; or any combination thereof.

It should be appreciated that the above referenced aspects and examples are non-limiting as others exist with the present invention, as shown and described herein. For example, any of the above mentioned aspects or features of the invention may be combined to form other unique configurations, as described herein, demonstrated in the drawings, or otherwise.

BRIEF DESCRIPTION OF THE DRAWINGS

FIG. 6 illustrates another perspective view of the disc brake assembly and the second embodiment shown in FIG. 5.

FIG. 7 illustrates an exploded perspective view of the disc brake assembly and the second embodiment shown in FIG. 6.

DETAILED DESCRIPTION OF THE INVENTION

Figure 1:
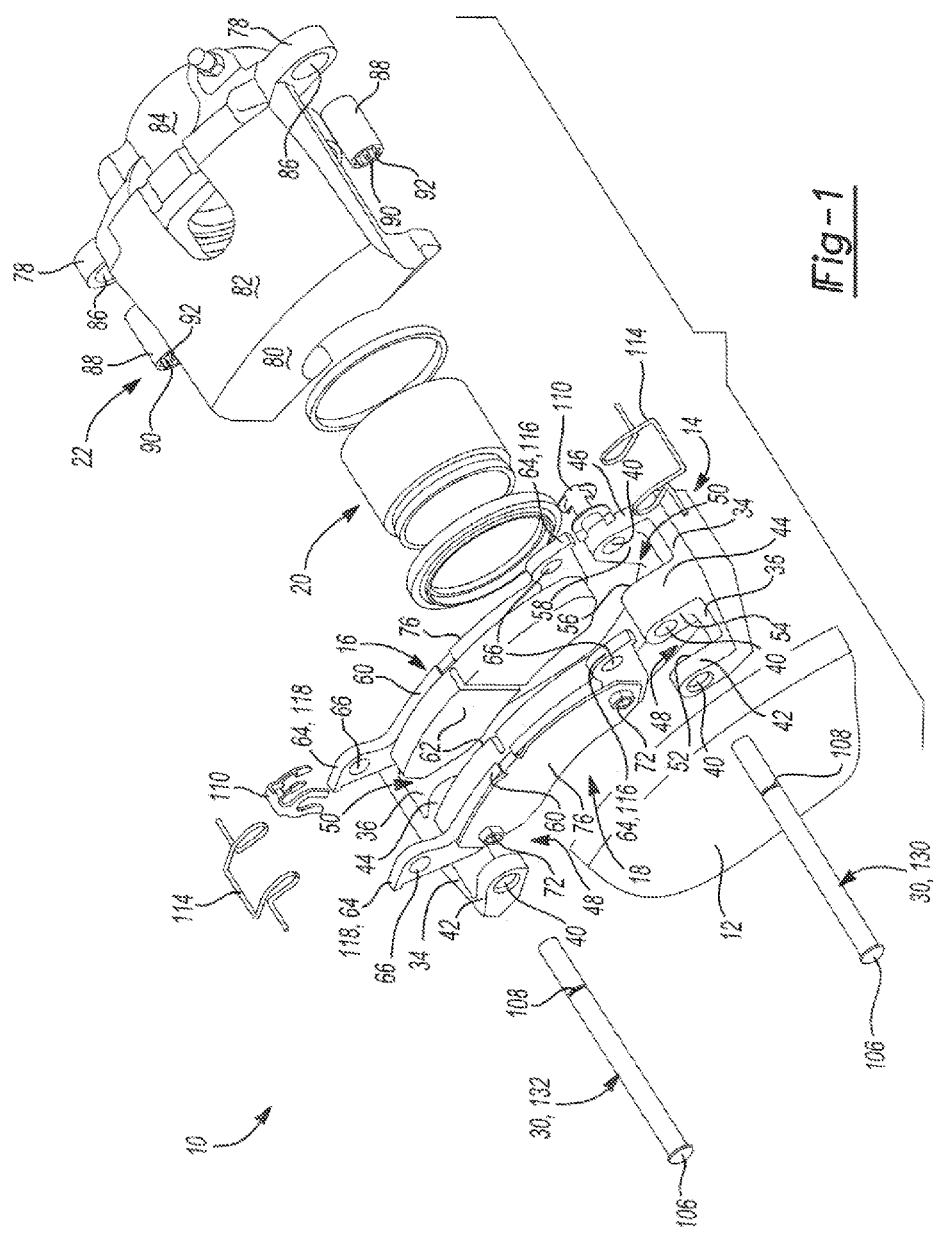
FIG. 1 illustrates an exploded perspective view of a disc brake assembly including a first embodiment of the present invention.

In a broad sense, the present invention is directed to an improved brake system for overcoming problems associated with taper wear and drag performance. In one aspect, the present invention is directed to an improved disc brake 10 operable to apply a clamping force to a rotatable disc 12 for an automotive vehicle. Though fewer or more components may be included in the disc brake 10, it is generally contemplate that the disc brake 10 with reference to FIGS. 1-4B will include a support bracket 14, inner and outer brake shoes 16, 18, a piston 20, a caliper body 22, and two opposing slide pins 30. The disc brake 10 typically will include the support bracket 14 having a pair of spaced apart frame members 34 at opposite ends of the support bracket. Each frame member 34 has an internal surface 36 with at least one arm extending therefrom. The arm may include an opening 40 for receiving the slide pins 30. It is appreciated that when two or more arms are included, a spacing may be provided therebetween defined by the side walls of the two or more arms and the internal surface 36 of the respective frame member 34. Generally both frame members of the support bracket may include the same number of arms extending therefrom, though not required. For example, it is appreciated that there may be one arm, two arms, or more extending from each opposing frame member or one frame member may include more or less arms extending therefrom than the other frame member. It is further appreciated the that arms may vary in size (e.g., thickness relative to radial axis of the rotatable disc) such that one or more arms may encapsulate a larger portion of the respective slide pin 30 than another arm.

Figure 2:
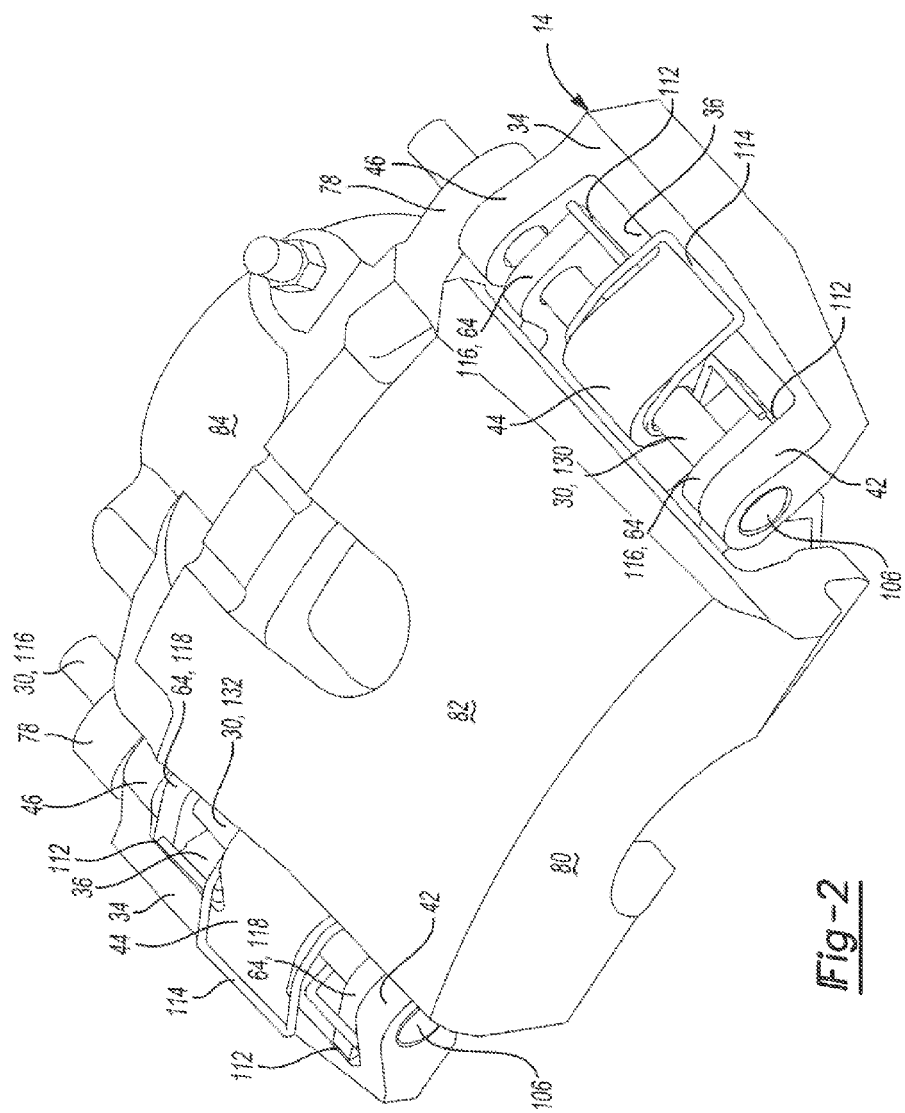
FIG. 2 illustrates a perspective view of the disc brake assembly and the embodiment shown in FIG. 1.

In one preferred embodiment as shown in FIG. 2, the frame members 34 include a first arm 42 located in an exterior portion of the disc brake 10, a second arm 44 located in a central portion of the disc brake 10, and a third arm 46 located in an interior portion of the disc brake 10. The opening 40 may extend through one or more of the first, second, and third arms 42, 44, 46 for engaging the slide pins 30. It is appreciated that the first, second, and third arms may be disposed in series with spaces 48, 50 therebetween, such that the openings 40 may be in general alignment. In one aspect, the spacings may include a first spacing 48 and second spacing 50. The first spacing 48 may be located between the first and second arms 42, 44. The first spacing 48 being defined by the side walls 52, 54 of the first and second arms 42, 44 and the interior surface 36 of the frame member 34 therebetween. The second spacing 50 may be located between the second and third arms 44, 46. The second spacing 50 being defined by the side walls 56, 58 of the second and third arms 44, 46 and the interior surface 36 of the frame member 34. When included, the first, second and third arms may provide sufficient support for the slide pins 30 so that pin deflection, pin stress, or otherwise, and any combination thereof may be reduced relative to a conventional caliper (e.g., current calipers that use pins to carry braking loads). As such, it is contemplated, that the diameter of the slide pins 30 in disc brakes having frame members with at least three arms may be reduced from about 20% to about 40%, and preferably from about 25% to about 35% relative to conventional calipers. For example, but not limited by, the load capacity of at least a triple supported 10 mm pin may be estimated to equal that of a 14 mm slide pin, supported only at the ends of the frame member of the support bracket. As such, by decreasing the diameter of the slide pins 30, the required packaging space for the disc brake 10 may be reduced that may allow for a larger rotatable disc 12 in the given package.

The disc brake 10 includes the inner brake shoe 16 and the outer brake shoe 18, each having a pressure plate 60 and a brake pad 62 (e.g., friction material). The inner and outer brake shoes 16, 18 are positioned such that the brake pads 62 opposing one another on opposite sides of the rotatable disc 12. It is appreciated that at least one of the inner and outer brake shoes 16, 18 may include projections 64 extending from opposite ends of the respective brake shoe 16, 18. When included, the projections 64 may be located about opposite end of the pressure plate 60 and may include openings 66 for receiving and slidably engaging the slide pins 30 to assist in supporting the respective inner and outer brake shoes 16, 18.

In one preferred embodiment, both the inner and outer brake shoes 16, 18 may include projections 64 with openings 66 for receiving the slide pins 30 for support thereon. Typically, the inner and outer brake shoes 16, 18 may be located in the spacings. For example, the projection 64 of the outer brake shoe 18 may be located within the first spacing 48 between the first and second arms 42, 44. Furthermore, the projections 64 of the inner brake shoe is located 16 may be located within the second spacing 50 between the second and third arms 44, 46. Advantageously, it is appreciated that one the projections 64 with the openings 66 have received the slide pins 30 during assembly of the disc brake 10, the slideably engaged inner and outer brake shoes 16, 18 are generally secured to the disc brake 10 such that the inner and outer brake shoes 16, 18 may not become substantially or completely disengaged from the disc brake 10 during the remaining assembly thereof.

It is contemplated, that the inner brake shoe 16, the outer brake shoe 18, or both may be at least partially in contact with the interior surfaces 36 of the frame members 34 for support thereon. Though preferably, both the inner and outer brake shoe 16, 18 are substantially or completely free of contact with the interior surfaces 36 of the frame members 34. In the latter arrangement, the inner and outer brake shoes 16, 18 may be substantially or completely supported by the slide pins 30. It is believed, that abutment may be used to describe an element of design which resists a load. For example, both slide pins 30 (e.g., leading and trailing slide pins as discussed below) may be used as abutments for the brake load, which is created by friction between rotatable disc 12 and inner and outer brake shoes 16, 18, as transferred to slide pins thru brake shoes, and then transferred from slide pins to the support bracket. It is further believed that in conventional designs, brake load may be transferred directly from the brake shoes to the support bracket (e.g., slide pins are abutments). As such, when the inner and outer brake shoes 16, 18 may be substantially or completely supported by the slide pins 30, the slide pins 30 are in abutment (e.g., the tangential brake loads encountered by the disc brake 10 during a brake-on position may be substantially or completely carried by the slide pins 30).

Figure 3:
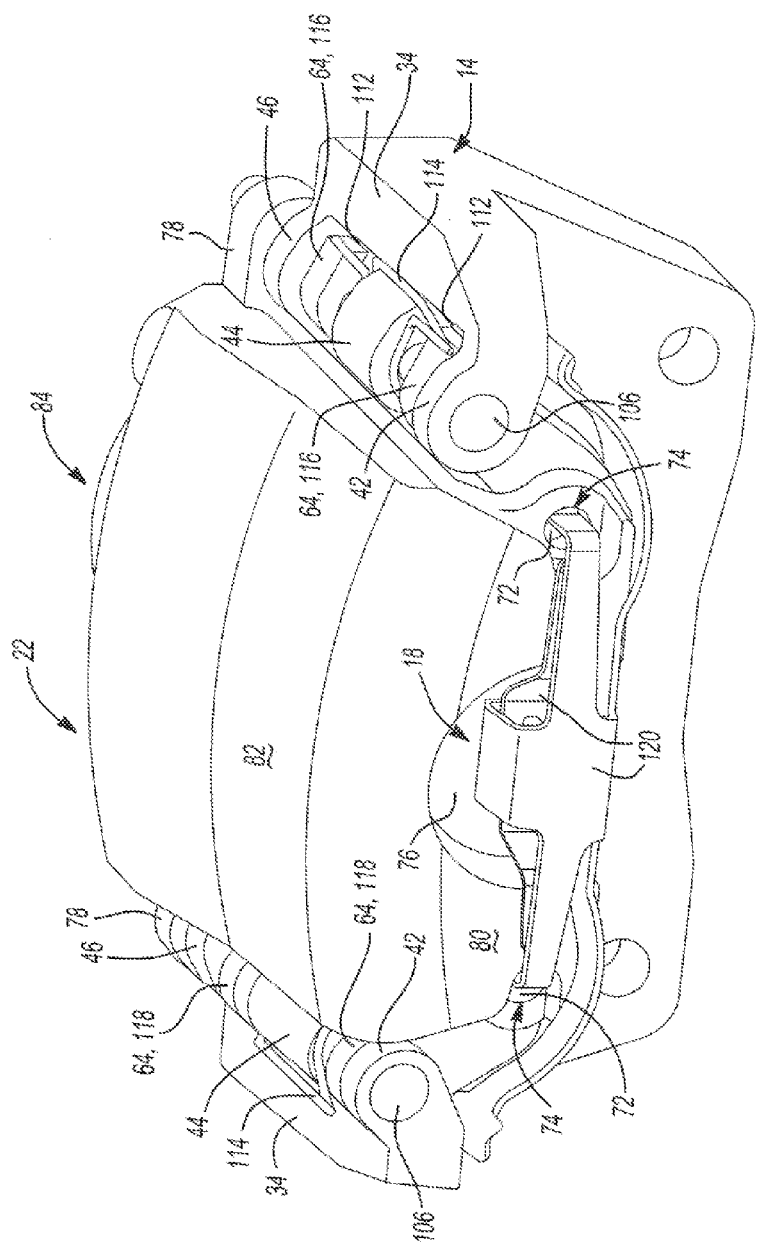
FIG. 3 illustrates another perspective view of the disc brake assembly and the embodiment shown in FIGS. 1 and 2.
Figure 4A:
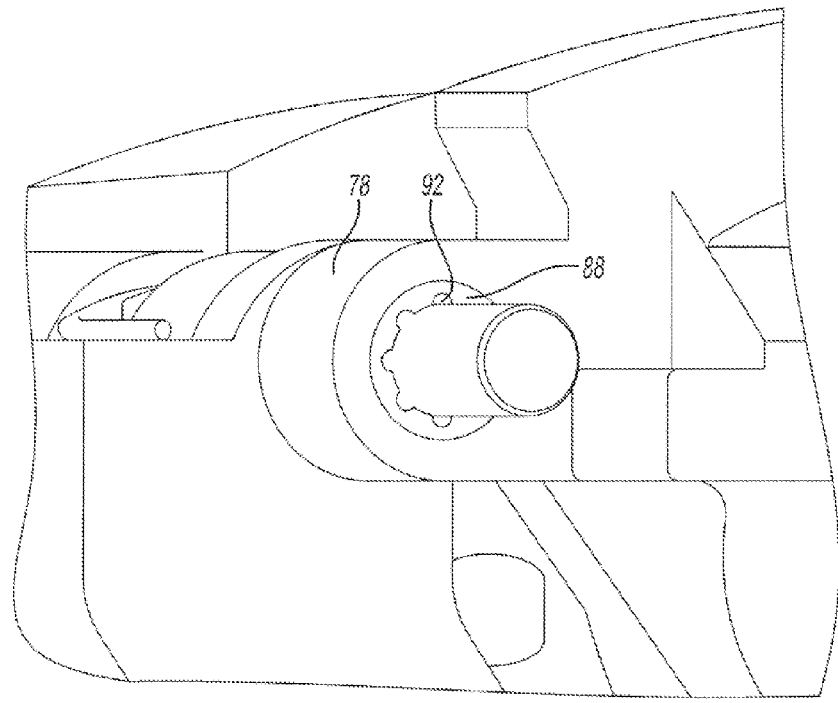
FIG. 4A illustrates a zoomed perspective view of the disc brake assembly and the embodiment shown in FIGS. 1-3.
Figure 4B:
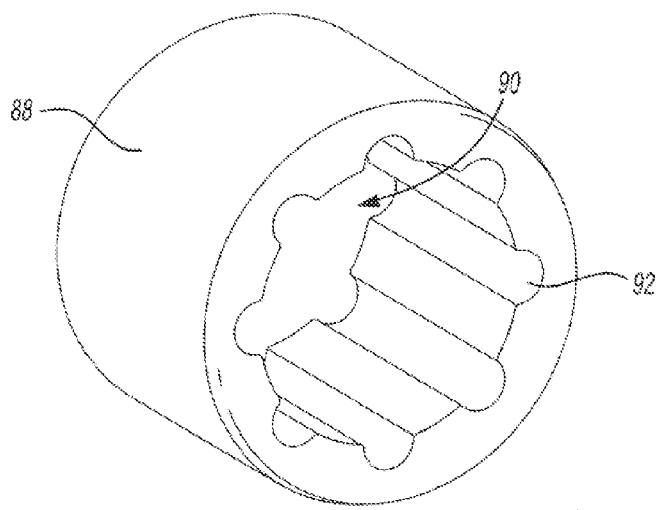
FIG. 4B illustrates a perspective view of one aspect according to the teachings of the present invention.

It is appreciated that the disc brake 10 may further include a biasing member 114 (e.g., spring, clip, or otherwise) to assist in maintaining the respective inner and outer brake shoes 16, 18 in position (e.g., during a brake-on position, a brake off-position, or both). In one exemplary embodiment as shown in FIGS. 2 and 3, end portions of the biasing member 114 are engaging corresponding ends of the inner and outer brake shoe, while a central portion of the biasing member 114 engages the second arm of the frame members 34. Desirably, the biasing member 114 may assist in maintaining a gap 112 (e.g., free of contact and/or in abutment) between the opposite ends of the inner and outer brake shoes 16, 18 and the interior surface 36 of the frame members 34. Accordingly, while being free of contact and/or in abutment, the inner and outer brake shoes 16, 18 may assist in providing a disc brake 10 with a pull-push type arrangement, as discussed herein.

It is believed, that the pull-push mode may refer to the concept that when initially, at relatively low loads and deflections, the braking load may react at the leading end of the brake shoe (e.g., brake pad) while the pressure plate is in tension (e.g., pull). At low loads, the brake shoe pulls the leading pin in the direction of wheel rotation such that the leading pin may then transfer the load to the support bracket. When the load increases, deflections may allow the trailing end of the brake shoe to contact its abutment (e.g., with slide pins) and the pressure plate loading may transition from tension to compression (e.g., push) sharing the load between leading and trailing abutments. In the present invention, this pull-push function may be achieved by controlling the clearances of the pins to the pressure plates of the brake shoes and to the support bracket, relative to the deflections of the support bracket. At generally the same time, the brake shoe may push the trailing pin in the direction of wheel rotation. Once the loads increase sufficiently, the deflections substantially or completely eliminate the clearances (e.g., between the slide pin and the opening) and the trailing end pin may then transfer the load to the support bracket. It is contemplated that because in this mode (e.g., Pull-Push mode), the leading pin may take (e.g., abuts) a larger load than the trailing pin. As discussed below, the caliper could also be arranged to behave in the opposite way, in which case the mode would be called Push-Pull.

It is further contemplated that at least one of the inner and outer brake shoes 16, 18 may include a first engagement portion for securement to a second engagement portion of the caliper body 22 and/or support bracket 14 thereof. The first and second engagement portions may be secured through fasteners 120 (e.g., clips, bolts, hooks, pins, or otherwise) or any attachment components. In one aspect, the first engagement portion may be a protrusion 72 (e.g., nub, or otherwise) and the second engagement portion may be an opening 74 for receiving the protrusion 72 or vice versa for engagement thereof. It is appreciated that the first engagement portion, the second engagement portion, or both may be integrally formed with or a separately added component to the respective inner and/or outer brake shoes 16, 18 and/or the caliper body 22. In a preferred embodiment, the outer brake shoe 18 may include the first engagement portion having a pair of protrusions 72 located on an exterior surface 76 of the pressure plate 60. Furthermore, the caliper body 22 may include the second engagement portion having a pair of openings 74 for engaging the pair of protrusions 72. It is appreciated that protrusions 72 may be located on the opposite ends of the outer brake shoe 18 along the exterior surface 76 of the pressure plate 60.

The disc brake 10 further includes the caliper body 22 slidably supported by slide pins 30, having the piston 20 operable to cause the inner and outer brake shoes 16, 18 to move towards one another for engaging the opposite sides of the rotatable disc 12. The caliper body 22 may include a finger portion 80 located in the exterior portion of the disc brake 10, a bridge portion 82 located in the central portion of the disc brake 10, and a piston portion 84 located in the interior portion of the disc brake 10. The caliper body 22 may further include at least one pair of spaced apart boss portions 78. The boss portions 78 may be located on opposite ends of the caliper body 22 and include openings 86 for receiving slide pins 30. It is appreciated that the slide pins 30 may provide support for the caliper body 22 such that the caliper body 22 may be partially, substantially or completely supported by the slide pins 30.

The boss portions 78 may further include a bushing 88. The bushing 88 may be integrally formed with the boss portion 78 or a separate component to be combined with the boss portion 78. In one embodiment, again with reference to FIGS. 1-4B, the boss portion 78 of the caliper body 22 may be formed separately from the bushing 88 and then combined. It is appreciated that the separately formed bushing 88 may be substantially or entirely polymeric. Polymeric materials that may be included, but are not limited to, are nylon, polyester, polycarbonate, or otherwise, or any combination thereof. The polymeric material may include a filler (e.g., glass or otherwise). The filler material may be included in amount of at least 20%, at least 40, or even at least 60% of the polymeric material. However, it is appreciated that lower amounts of the filled material may be included. Preferably, the polymeric material may have melting point (e.g., crystalline melting point) of at least 150° C., and more preferably at least about 200° C.

The bushing 88 includes an opening 90 to receive the slide pin 30 for slideable engagement thereof. It is appreciated that the bushing 88 provide low friction slide mechanisms for the caliper body 22. When included, it is appreciated that the slide mechanism may be free of being sealed, booted (e.g., boot seal), capped, greased, or any combination thereof. In one preferred embodiment, the bushing 88 includes a plurality of grooves 92 that define the opening 90. The grooves 92 may have a groove depth $D_G$ of about 5% to about 20%, and preferably of about 10% to about 15% of an inner diameter of the bushing 88. It is appreciated that the inner diameter of the bushing 88 may be taken from the deepest portion of the grooves 92. The grooves 92 may be longitudinally extending grooves having a profile. The profile of the grooves 92 may be a variety of differing shapes and sizes. The number of grooves may range from about 5 to about 15 grooves, and more preferably from about 8 to about 12 grooves. It is appreciated that fewer or more grooves are contemplated relative to the size of the disc brake. As illustrative examples, in FIG. 4B, the grooves 92 may have a multiple rounded (e.g., arcuate) groove profile. Other profiles are contemplated such as square profile, a triangular profile, a stepped profile, multiple grooves with similar or differing profiles, or any combination thereof. The profile may also include a portion with a flat side wall, an arcuate side wall, a flat bottom, an arcuate bottom, a portion substantially resembling a U-shape, a portion substantially resembling a V-shape, or any combination thereof.

It is further appreciated that the grooves 92 may assist in removing debris from the slide pins 30 while the bushings 88 slide along the slide pins 30. For example, during operation of the automotive, particles or otherwise (dust, debris, contaminates, or otherwise) may contact and/or become embedded within the bushings 88. The particles generally may become positioned within the grooves 92 such that to enable the caliper body 22 to continue to operate and slide along the slide pins 30. As the caliper body 22 slides along the slide pins 30, the particles may become dislodged from the grooves 92 so as to be substantially removed or eliminated from the bushing 88 through the opening 90, or more specifically through the grooves 92 caused by the sliding mechanism of the slide pins 30 through the bushings 92. It is believed that this configuration of the grooves 92 generally extends the operational-time of the caliper body by reducing lock-ups of the caliper body along the slide pins 30 resulting from particle build-up relative to conventional bushings without grooves.

In another embodiment, with reference to FIGS. 5-8C, the boss portions 78 may be integrally formed with the bushing 88 as one component (e.g., an integral boss component 96). Preferably, the integral boss component 96 may be substantially or entirely polymeric. It is appreciated that the integral boss component 96 may be separately formed and secured to the caliper body 22. As shown in FIGS. 8A and 8B, the integral boss component 96 includes the grooves 92 defining the opening 90, which function similarly to the discussion above. The integral boss component 96 further includes a first attachment portion for securing the integral boss component 96 to the caliper body 22. The caliper body 22 includes a second attachment portion for engaging the first attachment portion of the integral boss potion 96 for securement thereof. For example as shown in FIG. 7, the first attachment portion of the integral boss component 96 may include a protrusion 102 for engaging the second attachment portion of the caliper body 22. Furthermore, the second attachment portion of the caliper body 22 may include an opening 104 for receiving the protrusion 102 of the integral boss component 96. It is appreciated that other securement means may be utilized in securing the integral boss component 96 to the caliper body 22.

It is contemplated that the disc brake may be formed with defects such as variances (e.g., offset, crooked, or otherwise) in the openings, the slide pins, or otherwise and/or become defective due to variances (e.g., warpage, wear, or otherwise) caused by the surrounding environment such as temperature changes or otherwise. These variances may affect the slide mechanism of the disc brake 10. As such, it is appreciated that the integral boss components 96 may be individually deformable (e.g., rotatable, bendable, or otherwise) to assist in generally self-aligning the disc brake 10. More specifically, the integral boss components 96 may individually deform as needed to generally align the two slide pins such that the support bracket, one or both of the inner and outer brake shoes, the caliper body, or otherwise, or any combination thereof slidably engaging the slide pins 30 generally freely slides along the slide pins 30. It is believed that the design of the polymeric bushings 88 and/or the integral boss component 96 may be capable to generally self-align itself with the general position of the slide pins 30 such that slide forces and/or drag torque of the disc brake components along the slide pins 30 may be potentially reduced. As such, the self-aligning feature of the integral boss components 96 may position the slide pins 30 in a generally parallel manner relative to the rotational axis of the rotatable disc 12 to reduce such slide forces and/or drag torque along the slide pins 30.

Desirably, it is appreciated that the multiple rounded groove profile substantially reduces or eliminates stress concentrations about the polymeric bushings 88. Furthermore, it is appreciated that the polymeric bushings 88 and/or the integral boss component 96 may reduce a potential for rattle under vibration conditions.

In one preferred embodiment, the caliper body 22 includes a single pair of boss portions (78 with the polymeric bushings 88, FIG. 1-3 or 96, FIGS. 5-7) located near the piston portion 84 (e.g., inward of the support bracket arms such as the third arm 46 of the support bracket 14) for receiving the slide pins 30 for at least partially supporting the caliper body 22. The caliper body may be further supported through the second engagement portion as mentioned above. Desirably, the first engagement portion of the outer brake shoe 18 may include a pair of the protrusions 72 located generally at the opposite ends of the exterior surface of the brake shoe 18 (e.g., pressure plate 60). Furthermore, the second engagement portion of the caliper body 22 may include a pair of the openings 74 located generally at the opposite ends of the finger portion 80 of the caliper body 22. The finger portion 80 generally extends perpendicularly from the bridge portion 82 of the caliper body 22 such that the interior surface of the finger portion 80 extends generally parallel to the outer brake shoe 18 (e.g., pressure plate 60). As such, the pair of protrusions 72 along the exterior surface of the outer brake shoe 18 may be generally aligned with the pair of openings along the finger portion 80 of the caliper body 22 for engagement thereof such that the caliper body 22 may be secured to and at least partially supported by the outer brake shoe 18. It is believed in this configuration, whether self aligning (e.g., the integral boss component 96) or fixed bushing (e.g., the boss portions 78 with the polymeric bushings 88) are utilized, the disc brake support arrangement may provide the slide mechanism whose slide load may be relatively insensitive to deflections of the caliper body 22, the support bracket 14, the slide pins 30, and the inner and outer brake shoes.

As discussed above, the disc brake 10 further includes two opposing spaced apart slide pins 30 that are removably mounted to the disc brake 10. The slide pins 30 may be engaged with the openings of one or more disc brake components (e.g., the support bracket 14, the inner brake shoe 16, the outer brake shoe 18, the caliper body 22, or any combination thereof such that at least one of the disc brake components engaged thereto may be configured to slide along, support, or otherwise, or any combination thereof the slide pins 30. The slide pins 30 may be formed of a metallic material, a polymeric material, a composite material, or otherwise. The slide pins 30 may be longitudinally extending members generally parallel to another and to the rotational axis of the rotatable disc 12. The profile of the slide pins 30 may be a variety of differing shapes and sizes. The profile, size, weight, or otherwise of each slide pin 30 may be same or different. Preferably, the slide pins 30 are generally similar and include a profile that is generally arcuate, though not required.

Figure 5:
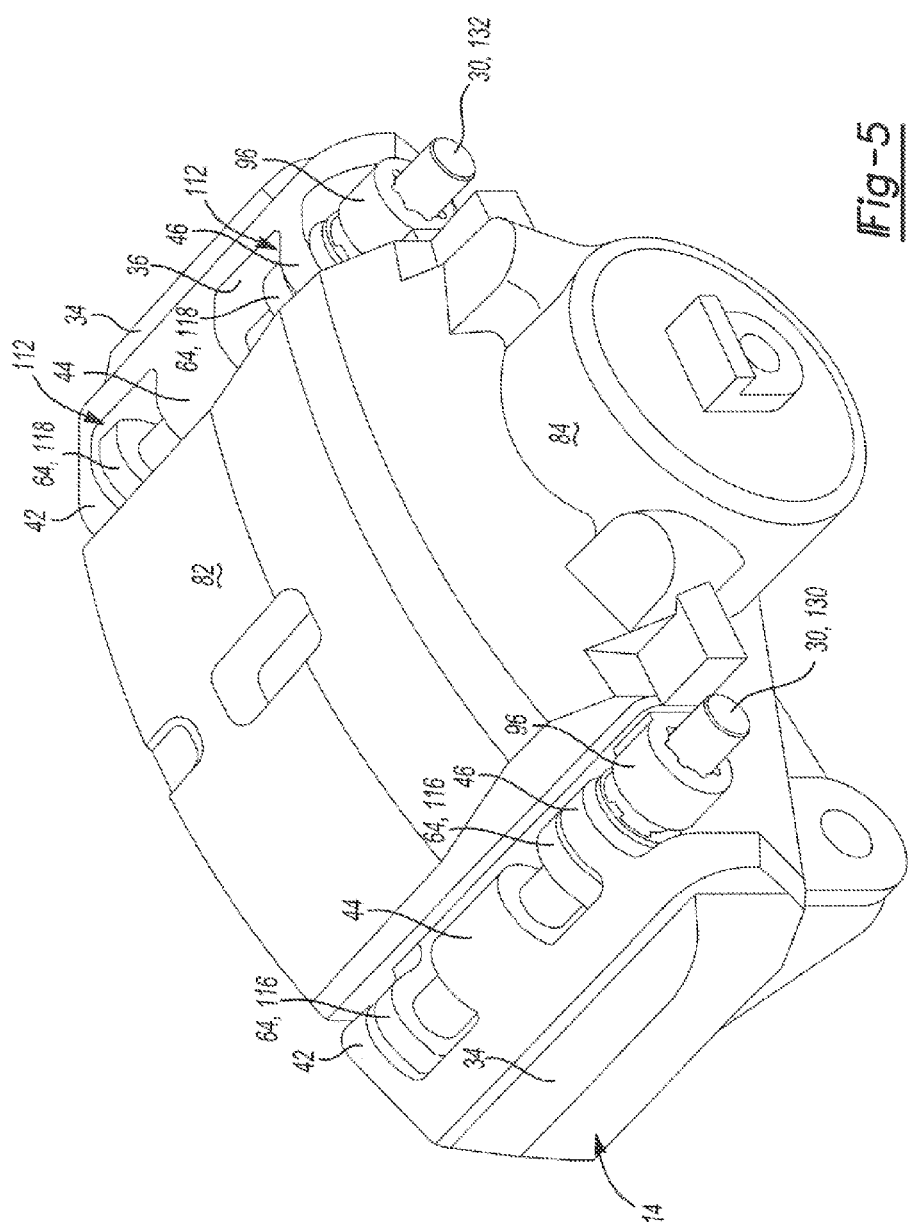
FIG. 5 illustrates a perspective view of a second embodiment according to the teachings of the present invention.
Figure 8A:
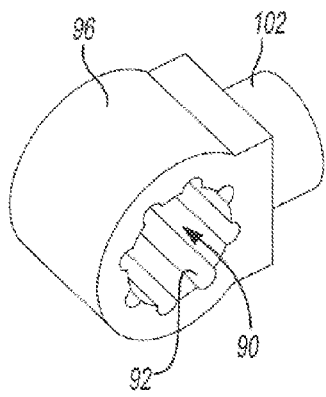
FIGS. 8A and 8B illustrate perspective views on another aspect according to the teachings of the present invention.
Figure 8B:
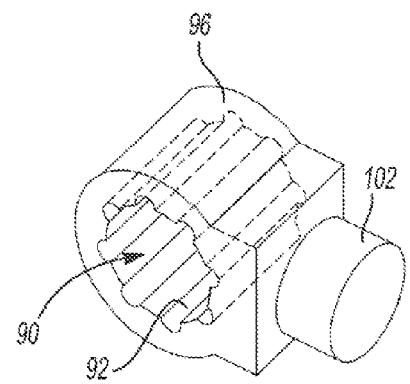
Figure 8C:
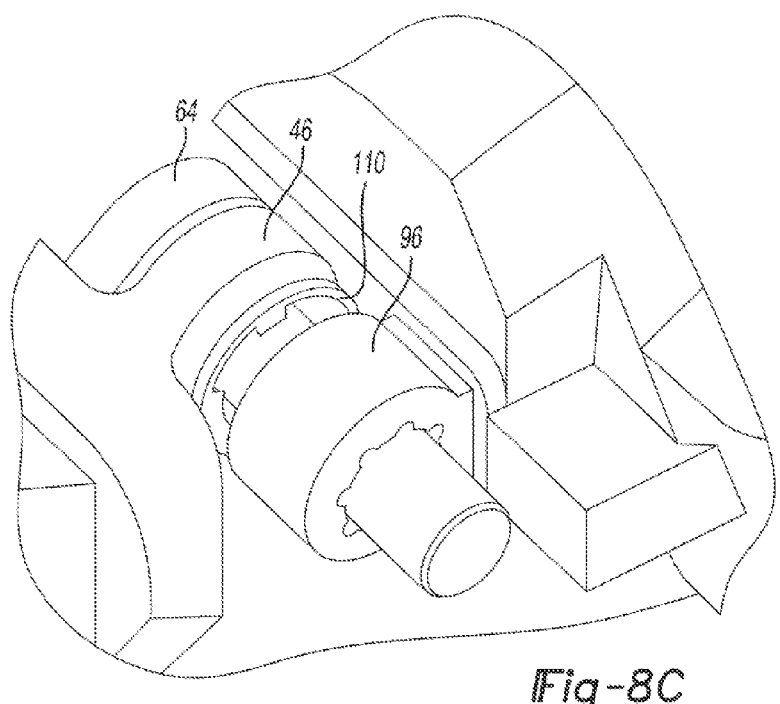
FIG. 8C illustrates a zoomed perspective view of the disc brake assembly and the embodiment shown in FIGS. 5-7.

The slide pins 30 typically include a retention feature for securing the slide pins 30 to the disc brake 10. In one aspect, the slide pins 30 may include a flange portion 106 for substantially or completely preventing the slide pins 30 from sliding through one or more openings along the slide pins 30 (e.g., through the openings of one or more of the support bracket 14, the inner brake shoe 16, the outer brake shoe 18, the caliper body 22, or otherwise that are slidably engaging the slide pins 30). Desirably, the flange portion 106 is located at an end portion of the slide pins 30 as shown in FIGS. 1, 5, and 7. Optionally or as an alternative, in another aspect, the slide pins 30 may include a depression 108 or otherwise for receiving a retention clip 110 (e.g., biasing member or otherwise) for substantially or completely preventing (e.g., retaining) the slide pins 30 from moving axially relative to the support bracket (e.g., through one or more openings of the disc brake components). It is appreciated that the retention clip 110 may be metallic such as stainless steel, plastic, a combination of both, or otherwise. In one exemplary embodiment as shown in FIGS. 2 and 3, the depression 108 may be generally positioned between the boss portions 78, 96 and the third arm 46 of the frame members 34 for receiving the retention clip 110. It is appreciated that the retention clip 110 may also provide a biasing mechanism for assisting the slide mechanism (e.g., the sliding of one or more of the support bracket 14, the inner brake shoe 16, the outer brake shoe 18, the caliper body 22, or otherwise that are slidably engaging the slide pins 30).

As mentioned above, it would be particularly attractive to provide an improved pin rail caliper having slide pins that provide brake load abutments while incorporating both "pull" and "push" type abutment modes. In one aspect, the disc brake may be configured to operate in "pull abutment mode" (i.e., the pressure plate of the brake shoe is in tension) at lower decelerations at which squeal noise may occur, and at which most wear takes place. In "pull" mode the brake shoe moment, due to the axial distance from the surface of the rotatable disc to the brake shoe abutment, may reduce the tendency for the brake shoe to "self apply" (e.g., the brake shoe partially engaging the surface of the rotatable disc while in a brake-off position such that the operator of the vehicle has removed contact from the brake pedal). This reduction in the tendency to "self apply" is believed to generally reduce the propensity for squeal and/or taper wear. In another aspect, the disc brake may be designed to transition to "pull—push" abutment mode at higher decelerations to share the brake load between the leading (e.g., rearward) and the trailing (e.g., forward) projections of the inner and outer brake shoes (e.g., pressure plates), thereby substantially reducing or eliminating the need of an outer support tie bar (e.g., typically located on an outer portion of the support bracket) and hence gain weight savings.

For purposes of discussion in one exemplary embodiment, the rotatable disc 12 will be assumed to be rotating in the counter-clockwise direction (e.g., facing the exterior portion of caliper such as the finger portion 80 of the caliper body 22). In accordance with the present invention, the brake torque generated upon engagement of each brake pad 62 with its respective engagement surface of the rotatable disc 12 may be transferred to both slide pins in the following manner.

For reference purposes, slide pins 30 include a rearward pin 130 (e.g., leading pin) and a forward pin 132 (e.g., trailing pin) and projections 64, which include a rearward projection 116 and a forward projection 118. It is appreciated, that in the counter-clockwise rotation direction of the rotatable disc 12, the rearward projections 116 of the inner and outer brake shoes 16, 18 respectively, initially engage the rearward pin 130. Deflection of the associated rearward projections 116 results in engagement of the forward projections 118 with the forward pin 132. More specifically, upon application of the brakes (e.g., brake-on position), the rearward pin 130 is acted upon by the rearward projections 116 of the inner and outer brake shoes 16, 18. The brake shoe friction force causes the rearward projections 116 to elastically deflect, producing engagement between the forward pin 132 and the forward projections 118 of the inner and outer brake shoes 16, 18 respectively as well as between the rearward pin 130 and the rearward projections 116. Hence, the desired pull-push brake shoe engagement mode results, with the inner and outer brake shoes 16, 18 pulling on the rearward pin 130 (e.g., generally at low brake loads) and pushing against the forward pin 132 (e.g., generally at high brake loads). Initial engagement of the rearward projections 116 provides a stable brake engagement, minimizing uneven friction material (e.g., pad) wear and engagement noise. By "leading pin" it is meant that the slide pin is associated with the end of the brake shoe that, given a particular rotation direction of rotatable disc 12, leads the rest of the brake shoe. With reference to FIGS. 2 and 3, for counter-clockwise rotation of the rotatable disc 12, the rearward pin 130 is the leading pin and the forward pin 132 is the trailing pin. Accordingly, for clockwise rotation of the rotatable disc 12, the forward pin 132 is the leading pin and the rearward pin 130 is the trailing pin.

It is appreciated, that if the direction of the rotatable disc 12 rotation is clockwise instead of counter-clockwise, the engagement pattern being essentially the converse of that described above. For example, the forward projections 118 of the inner and outer brake shoes 16, 18 respectively initially engage the forward pin 132 (e.g., leading pin). Deflection of the associated forward projections 118 results in engagement of the rearward projections 116 with the rearward pin 130 (e.g., trailing pin).

By having the inner and outer brake shoes first engage the leading pin, and then deflecting to engage the trailing pin to achieve pull-push engagement, the present invention reduces the vibration often associated with prior art push-only or pull-only disc brake system by relatively evenly distributing the braking load transferred to the rotatable disc between the two slide pins.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such features may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The invention claimed is:

1. A disc brake comprising:
a) a support bracket including:
   i. a pair of spaced apart frame members at opposite ends of the support bracket;
   ii. at least two arms extending from each of the frame members; and
   iii. an opening in each of the arms;
b) an inner brake shoe that includes a leading projection with an opening and a trailing projection with an opening on opposite ends of the brake shoe;
c) an outer brake shoe that includes a leading projection with an opening and a trailing projection with an opening on opposite ends of the brake shoe;
d) a leading slide pin;
e) a trailing slide pin;
f) the leading slide pin and the trailing slide pin are opposing and engage with the respective openings in the at least two arms and the openings in the projections of the brake shoes so that the brake shoes are supported by the two opposing slide pins and the two opposing slide pins are supported by the at least two arms;
g) a slidable piston operable to cause the inner and outer brake shoes to move towards one another; and
h) a caliper body including a single pair of spaced apart boss portions, located near the slidable piston, that include an opening with a bushing for receiving the slide pins;
   wherein the caliper body is supported on the slide pins by the single pair of spaced apart boss portions so that the caliper body is only supported on the slide pins by the single pair of spaced apart boss portions.

2. The disc brake of claim 1, wherein a leading end of one or more of the brake shoes is pulled into contact with the leading slide pin and causes the leading slide, pin, the frame member in which it engages, or both to deflect so that a trailing end of the one or more brake shoes is pushed into contact with the trailing slide pin.

3. The disc brake of claim 2, wherein the disc brake is configured to operate in pull abutment mode, thereby, reducing the tendency to self-apply, and the reduction in self-apply reduces squeal, taper wear, or both.

4. The disc brake of claim 1, wherein the inner brake shoe, outer brake shoe, or both include a first engagement portion, and the caliper body includes a second engagement portion.

5. The disc brake of claim 4, further includes a clip for securing the first engagement portion to the second engagement portion.

6. The disc brake of claim 5, wherein the bushing includes grooves.

7. The disc brake of claim 6, wherein the disc brake is configured to operate in pull abutment mode, thereby, reducing the tendency to self-apply, and the reduction in self apply reduces squeal, taper wear, or both.

8. The disc brake of claim 1, wherein the support bracket does not include an outer support tie bar.

9. The disc brake of claim 1, wherein the pair of spaced apart boss portions are separately formed and secured to the caliper body.

10. The disc brake of claim 1, wherein each of the at least two arms extending from the frame members include:
   a) an outboard arm located in an outboard position, and
   b) an inboard arm located in an inboard position,
   wherein the outboard arm and the inboard arm are separated by a spacing therebetween.

11. A disc brake comprising:
   a) a support bracket including:
      i. a pair of spaced apart frame members at opposite ends of the support bracket;
      ii. three arms extending from each the frame members; and
      iii. an opening in each of the arms;
   b) an inner brake shoe that includes a leading projection with an opening and a trailing projection with an opening on opposite ends of the brake shoe;
   c) an outer brake shoe that includes a leading projection with an opening and a trailing projection with an opening on opposite ends of the brake shoe;
   d) a leading slide pin;
   e) a trailing slide pin;
   f) the leading slide pin and the trailing slide pin are opposing and engage with the respective openings in the three arms and the openings in the projections of the brake shoes so that the brake shoes are supported by the two opposing slide pins and the two opposing slide pins are supported by the three arms;
   g) a slidable piston operable to cause the inner and outer brake shoes to move towards one another
   h) a caliper body including a single pair of spaced apart boss portions, located near the slidable piston, that include an opening with a bushing for receiving the slide pins;
      wherein the caliper body is supported on the slide pins by the single pair of spaced apart boss portions so that the caliper body is only supported on the slide pins by the single pair of spaced apart boss portions.

12. The disc brake of claim 11, wherein a leading end of the one or more brake shoes is pulled into contact with the leading slide pin and causes the leading slide pin, the frame member in which it engages, or both to deflect so that a trailing end of the one or more brake shoes is pushed into contact with the trailing slide pin.

13. The disc brake of claim 11, wherein the inner brake shoe, outer brake shoe, or both, include a first engagement portion, the caliper body includes a second engagement portion.

14. The disc brake of claim 13, further includes a clip for securing the first engagement portion to the second engagement portion.

15. The disc brake of claim 13, wherein the bushing includes grooves.

16. The disc brake of claim 15, wherein the disc brake is configured to operate in pull abutment mode, thereby, reducing the tendency to self-apply, and the reduction in self apply reduces squeal, taper wear, or both.

17. The disc brake of claim 13, wherein the disc brake is configured to operate in pull abutment mode, thereby, reducing the tendency, to self-apply, and the reduction in self-apply reduces squeal, taper wear, or both.

18. The disc brake of claim 11, wherein the support bracket does not include an outer support tie bar.

19. The disc brake of claim 11, wherein the pair of spaced apart boss portions are separately formed and secured to the caliper body.

20. The disc brake of claim 11, wherein the three arms extending from each of the frame members include:
   c) an outboard arm located in an outboard position,
   d) an inboard arm located in an inboard position, and
   e) a central arm located in a central position between the outboard arm and the inboard arm,
   wherein the outboard arm, the central arm, and the inboard arm are separated by a spacing therebetween each respective arm.

* * * * *

UNITED STATES PATENT AND TRADEMARK OFFICE
CERTIFICATE OF CORRECTION

PATENT NO. : 8,251,188 B2
APPLICATION NO. : 12/212228
DATED : August 28, 2012
INVENTOR(S) : Boris Teper et al.

It is certified that error appears in the above-identified patent and that said Letters Patent is hereby corrected as shown below:

Column 14, Line 24, Claim 15 should read as; "The disc brake of claim 14, wherein the bushing includes grooves."

Signed and Sealed this
Sixth Day of November, 2012

David J. Kappos
*Director of the United States Patent and Trademark Office*